US006984681B2

(12) United States Patent
Hagiwara et al.

(10) Patent No.: US 6,984,681 B2
(45) Date of Patent: Jan. 10, 2006

(54) METHOD FOR PRODUCING A CARBOXYL GROUP CONTAINING RUBBER

(75) Inventors: Shogo Hagiwara, Chiba (JP); Masao Koga, Chiba (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 239 days.

(21) Appl. No.: 10/451,074

(22) PCT Filed: Dec. 21, 2001

(86) PCT No.: PCT/JP01/11283

§ 371 (c)(1),
(2), (4) Date: Jun. 20, 2003

(87) PCT Pub. No.: WO02/50126

PCT Pub. Date: Jun. 27, 2002

(65) Prior Publication Data

US 2004/0048970 A1 Mar. 11, 2004

(30) Foreign Application Priority Data

Dec. 21, 2000 (JP) ............................ 2000-388413

(51) Int. Cl.
*C08K 3/38* (2006.01)

(52) U.S. Cl. ...................................... 524/405; 524/459

(58) Field of Classification Search ................ 524/405, 524/459
See application file for complete search history.

(56) References Cited

U.S. PATENT DOCUMENTS 4,508,885 A 4/1985 Nishiwaki et al. .......... 526/318

FOREIGN PATENT DOCUMENTS

| | | |
|---|---|---|
| EP | 1 097 950 | 5/2001 |
| JP | 60-36502 | 2/1985 |
| JP | 2001-131224 | 5/2001 |

*Primary Examiner*—Peter D. Mulcahy
(74) *Attorney, Agent, or Firm*—Oblon, Spivak, McClelland, Maier & Neustadt, P.C.

(57) ABSTRACT

A method for producing a carboxyl group-containing rubber having good vulcanization characteristics and exhibiting good resistance to scorching, continuously and in good yield.

A method for producing a dry rubber from a polyvinyl alcohol-containing latex of a carboxyl group-containing rubber by continuously carrying out coagulation, dewatering, washing and drying in a dewatering/drying apparatus of a screw extruder type, characterized in that a coagulating agent containing ammonium borate is used.

11 Claims, 2 Drawing Sheets

METHOD FOR PRODUCING A CARBOXYL GROUP CONTAINING RUBBER

TECHNICAL FIELD

The present invention relates to a method for producing a carboxyl group-containing rubber having good vulcanization characteristics and exhibiting good resistance to scorching, continuously and in good yield, from a latex of a carboxyl group-containing rubber, which contains a polyvinyl alcohol as an emulsifier or dispersant, by continuously carrying out coagulation, dewatering, washing and drying in a dewatering/drying apparatus of a screw extruder type employing a certain specific coagulating agent.

BACKGROUND ART

In recent years, along with trends for high speed and large sizing of industry, rubber components to be used in such industry tend to be required to have an increasingly high level of durability. Especially, the trends for high speed and large sizing tend to bring about an increase in the operation temperature of the machine and apparatus, whereby a high level of heat resistance is required for the rubber components, and at the same time, due to an increase in the temperature of a lubricating oil, an improvement in oil resistance is required for the rubber components. Further, for the use in a severe environment such as in a cold area due to an expansion of the industrial activities, the demand for cold resistance has increased for the rubber components.

JP-B-59-14498 discloses that a rubber composition comprising a vulcanizing agent and a copolymer made of ethylene, vinyl acetate, an acrylate and a monoepoxy monoolefin compound such as glycidyl methacrylate, as a crosslinking site monomer, is excellent in the oil resistance, heat resistance and weather resistance.

With such a composition, it is observed that the balance of the oil resistance, heat resistance and weather resistance, is good. However, in view of the severe conditions in use as mentioned above, a further improvement has been desired in the balance of the oil resistance, cold resistance and heat resistance.

Further, such a composition can be vulcanized by means of a vulcanization system such as a fatty acid soap/sulfur, a polyamine type, or a carboxylic acid and its ammonium salt, and the mechanical properties are good. However, it has a drawback that the vulcanization speed is slow.

Namely, in order to obtain the desired physical properties, it is common that after carrying out usual vulcanization, post vulcanization is carried out. If this post vulcanization can be omitted completely or if the time required for the post vulcanization can be shortened, such will be industrially very significant, and the demand for a rubber composition improved for such a purpose, has rapidly increased.

It is known by JP-A-50-45031 that an elastomer composition containing an alkyl acrylate or ethylene/an alkyl acrylate as the main component and employing alkyl monoester of a butene-1,4-dionic acid as a crosslinking site monomer, has a good vulcanization speed.

On the other hand, as a method for producing such a rubber, it is common to employ a method wherein a rubber latex is firstly obtained by polymerization, and an acid or a salt is, for example, added thereto for coagulation, followed by dewatering and further drying.

JP-B-3-29085 discloses a continuous production method for a dry rubber wherein a mixture comprising a rubber latex containing a polyvinyl alcohol as an emulsifier, and a boron compound and a compound containing a sulfate group, as coagulating agents, is dewatered and supplied to a drying apparatus, so that coagulation, dewatering, drying, etc., can be carried out continuously and in good yield.

However, in a case where the rubber latex is a latex of a carboxyl group-containing rubber, the coagulation state tends to be inadequate, whereby there will be a drawback such that it is not durable against mechanical pressing, the yield of the dry rubber tends to be inadequate, and the obtained dry rubber tends to undergo scorching in the kneading step.

The present invention is to solve the above problems and to provide a method for producing a carboxyl group-containing rubber having good vulcanization characteristics and exhibiting good resistance to scorching, continuously and in good yield.

DISCLOSURE OF THE INVENTION

As a result of an extensive study to solve the above-mentioned problems, the present inventors have found it possible to obtain a rubber having a good vulcanization speed and exhibiting good resistance to scorching, by carrying out coagulation, dewatering, washing and drying of a latex of a carboxyl group-containing rubber, containing a polyvinyl alcohol as an emulsifier or dispersant, continuously in a screw extruder by means of a specific coagulating agent, and have accomplished the present invention.

Namely, the present invention provides a method for producing a carboxyl group-containing rubber wherein a dry rubber is produced from a polyvinyl alcohol-containing latex of a carboxyl group-containing rubber by continuously carrying out coagulation, dewatering, washing and drying in a dewatering/drying apparatus of a screw extruder type, characterized in that a coagulating agent containing ammonium borate is used.

BEST MODE FOR CARRYING OUT THE INVENTION

Figure 1:
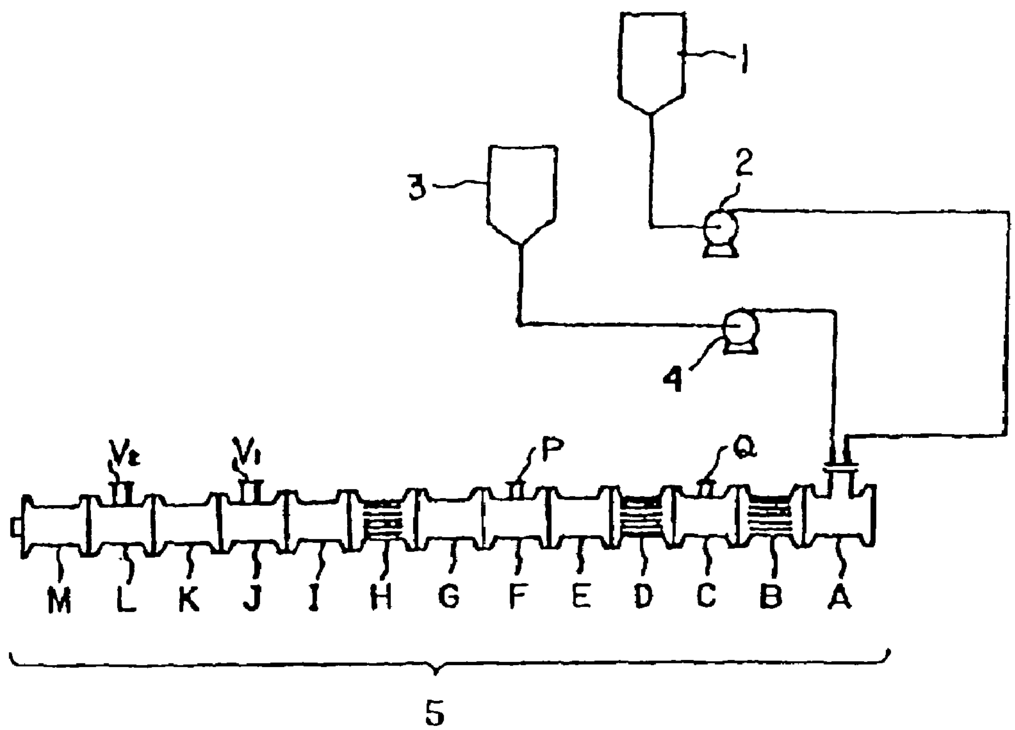
FIG. 1 is a view illustrating the entire apparatus.

Now, the present invention will be described in detail.

The latex of a carboxyl group-containing rubber to be used in the present invention is not particularly limited so long as it is a rubber latex containing a polyvinyl alcohol as an emulsifier or dispersant and having a carboxyl group-containing compound copolymerized. However, particularly preferred is a latex wherein a polyvinyl alcohol is suitable as an emulsifier or dispersant, for example, a copolymer latex of a ethylene/vinyl acetate/an alkyl acrylate and/or an alkoxyalkyl acrylate/a carboxyl group-containing compound, or a copolymer latex of a ethylene/an alkyl acrylate and/or an alkoxyalkyl acrylate/a carboxyl group-containing compound.

The carboxyl group-containing rubber of the present invention preferably comprises (A) from 0 to 5 mass % of an ethylene monomer unit, (B) from 0 to 50 mass % of a vinyl acetate monomer unit, (C) from 1 to 12 mass % of a monoalkyl maleate unit of the following formula (1) and/or a monoalkoxyalkyl maleate unit of the formula (2), and (D) from 99 to 33 mass % of an alkyl acrylate unit and/or an alkoxyalkyl acrylate unit:

Formula (1)

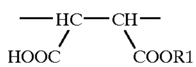

wherein R1 is a $C_{1-4}$ alkyl group,

Formula (2)

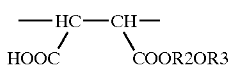

wherein R2 is a $C_{1-4}$ alkylene group, and R3 is a $C_{1-4}$ alkyl group.

(A) The ethylene monomer unit in the carboxyl group-containing rubber of the present invention, is preferably from 0 to 5 mass %, more preferably from 0.1 to 3 mass %, further preferably from 0.5 to 2.5 mass %.

(B) The vinyl acetate monomer unit of the present invention is preferably from 0 to 50 mass %, more preferably from 0 to 30 mass %, further preferably from 0 to 10 mass %.

As an example of the carboxyl group-containing compound to be used in the present invention, acrylic acid, methacrylic acid, crotonic acid, 2-pentanoic acid, maleic acid, fumaric acid, itaconic acid, a monoalkyl maleate or a monoalkoxyalkyl maleate may, for example, be mentioned. From the viewpoint of the practical balance of the vulcanization characteristics/resistant to scorching, (C) the monoalkyl maleate or the monoalkoxyalkyl maleate represented by the above formula (1) or (2), is preferred, and specifically, monomethyl maleate, monoethyl maleate, monobutyl maleate, monomethoxyethyl maleate, monoethoxyethyl maleate, monomethoxybutyl maleate or monoethoxybutyl maleate, may, for example, be mentioned.

(C) The monoalkyl maleate and/or the monoalkoxyalkyl maleate unit of the present invention, is preferably from 1 to 12 mass %, more preferably from 3 to 10 mass %.

As (D) the alkyl acrylate to be used in the present invention, methyl acrylate, ethyl acrylate, n-propyl acrylate, isobutyl acrylate, n-butyl acrylate, n-pentyl acrylate, n-hexyl acrylate, n-butyl acrylate or 2-ethylhexyl acrylate may, for example, be mentioned, and from the viewpoint of the mechanical properties and the practical cold resistance/oil resistance balance, ethyl acrylate, n-propyl acrylate or n-butyl acrylate, is preferred.

As (D) the alkoxyalkyl acrylate to be used in the present invention, 2-methoxyethyl acrylate, 2-ethoxyethyl acrylate, 2-(n-propoxy)ethyl acrylate, 2-(n-butoxy)ethyl acrylate, 3-methoxypropyl acrylate, 3-ethoxypropyl acrylate, 2-(n-propoxy)propyl acrylate or 2-(n-butoxy)propyl acrylate may, for example, be mentioned.

(D) the alkyl acrylate and/or the alkoxyalkyl acrylate unit of the present invention, is preferably from 99 to 33 mass %, more preferably from 95 to 50 mass %.

To the carboxyl group-containing rubber of the present invention, another monomer copolymerizable with the above-mentioned monomers, may be copolymerized within a range not to impair the purpose of the present invention. Such another copolymerizable monomer may be an acrylate such as cyanomethyl acrylate, 1-cyanoethyl acrylate, 2-cyanoethyl acrylate, 1-cyanopropyl acrylate, 2-cyanopropyl acrylate, 3-cyanopropyl acrylate, 4-cyanobutyl acrylate, 6-cyanohexyl acrylate, 2-ethyl-6-cyanohexyl acrylate, or 8-cyanooctyl acrylate.

Further, a fluorinated acrylate such as 1,1-dihydroperfluoroethyl (meth)acrylate, 1,1-dihydroperfluoropropyl (meth) acrylate, 1,1,5-trihydroperfluorohexyl (meth)acrylate, 1,1,2,2-tetrahydroperfluoropropyl (meth)acrylate, 1,1,7-trihydroperfluoroheptyl (meth)acrylate, 1,1-dihydroperfluorooctyl (meth)acrylate or 1,1-dihydroperfluorodecyl (meth)acrylate, a hydroxy group-containing acrylate such as 1-hydroxypropyl (meth)acrylate, 2-hydroxypropyl (meth)acrylate or hydroxyethyl (meth) acrylate, a tertiary amino group-containing acrylate such as diethylaminoethyl (meth)acrylate, or dibutylaminoethyl (meth)acrylate, a methacrylate such as methyl (meth)acrylate or octyl (meth)acrylate, an alkyl vinyl ketone such as methyl vinyl ketone, a vinyl or allyl ether, such as vinyl ethyl ether or allyl methyl ether, a vinyl aromatic compound such as styrene, α-methylstyrene, chlorostyrene or vinyl toluene, a vinyl nitrile such as acrylonitrile or methacrylonitrile, or an ethylenic unsaturated compound such as propylene, vinyl chloride, vinylidene chloride, vinyl fluoride, vinylidene fluoride, vinyl propionate or an alkyl malate, may, for example, be mentioned.

Further, an epoxy group-containing compound such as glycidyl acrylate, glycidyl (meth)acrylate, allyl glycidyl ether or methallyl glycidyl ether or an active chlorine group-containing compound such as 2-chloroethyl vinyl ether, 2-chloroethyl acrylate, vinyl benzyl chloride, vinyl chloroacetate or allyl chloroacetate, may, for example, be mentioned.

The polyvinyl alcohol to be used in the present invention may be any among a partially saponified polyvinyl alcohol, a completely saponified polyvinyl alcohol and a modified polyvinyl alcohol, and its amount is from 2 to 7 parts by mass, preferably from 4 to 7 parts by mass, per 100 parts by mass of the polymer.

As the coagulating agent of the present invention, a coagulating agent containing ammonium borate, or a coagulating agent containing both ammonium borate and ammonium sulfate, is used.

To the coagulating agent of the present invention, in addition to the above compound, a gelling agent for the polyvinyl alcohol may be mixed within a range not to impair the purpose of the present invention.

As the gelling agent which can be mixed, a boron compound such as boric acid, potassium tetraborate, ammonium hydrogen tetraborate or sodium tetraborate (borax), or a compound containing a sulfate group, such as sodium sulfate, potassium sulfate, ferrous sulfate, copper sulfate, zinc sulfate, aluminum sulfate, alum or sulfuric acid, may be mentioned.

The amount of the coagulating agent to be used, is from 0.2 to 15 parts by mass, preferably from 0.5 to 10 parts by mass, per 100 parts by mass of the polymer. If the amount of the coagulating agent is less than 0.2 part by mass, the polymer will not be sufficiently coagulated, and the separated water tends to be turbid, and the yield of the dry polymer tends to be poor. On the other hand, if it exceeds 15 parts by mass, the coagulating agent tends to remain in the polymer, whereby the physical properties of the polymer may sometimes be deteriorated.

The dewatering/drying apparatus of the present invention may be any apparatus so long as it is one of a screw extruder type and whereby at least dewatering and drying can be carried out in the same apparatus. Specifically, it may be one of a screw extruder type having a function for mechanical squeezing and discharge of free water thereby formed, from a slit and a drying function by heating and evacuating from a vent, in the same apparatus.

The casing for the dewatering/drying apparatus may be of a divided type or a unitary type, and screws may also be a combination of divided ones or of a unitary type, but divided ones are preferred, since an optional function can be selected by a free combination thereof.

The screws are preferably those having a squeezing mechanism having a forward screw and a backward screw combined in series.

Further, the screws are preferably twin screws rotating in the same direction and having a self cleaning mechanism.

Now, the method of the present invention and the apparatus to be used will be described with reference to the apparatus used in Examples of the present invention, although the present invention is by no means restricted to the method and the apparatus as described below.

Figure 3:
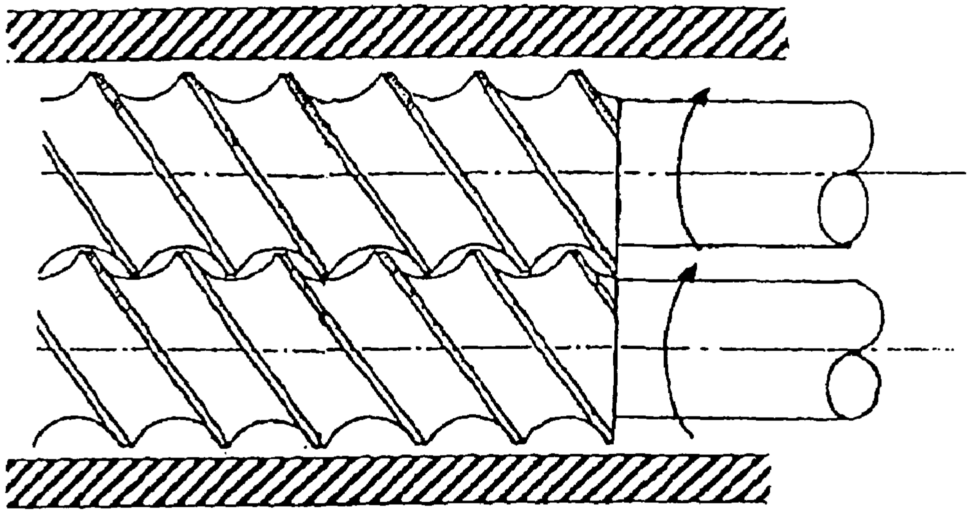
FIG. 3 is a schematic view (a plan view) showing the relation between the casing and the screws in the dewatering/drying apparatus.
Figure 4:
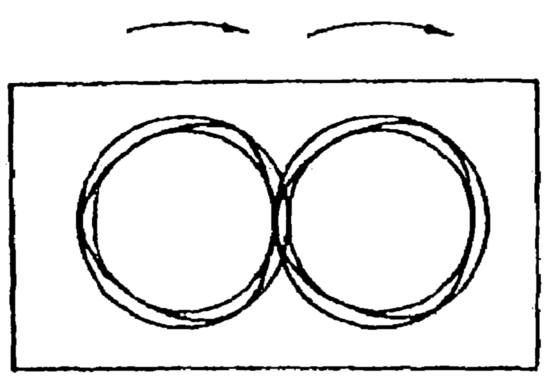
FIG. 4 is a schematic view (a cross-sectional view) showing engagement of scraping type (self cleaning type) screws.

FIG. 1 is a view illustrating the entire apparatus, FIG. 3 is a view showing the relation between the casing and screws of the dewatering/drying apparatus, and FIG. 4 is a schematic view illustrating scraping type (self cleaning type) screws.

In FIG. 1, reference numeral 1 indicates a storage tank for the carboxyl group-containing rubber latex, 3 a storage tank for the coagulating solution, 2 and 4 pumps, and 5 a dewatering/drying apparatus of a screw extruder type with two screws rotating in the same direction and with divided casings A to M connected one another. A indicates a casing for supplying the raw material, B, D and H slit casings, C and F injection casings having injection holes P and Q, respectively, J and L vent casings having vent holes V1 and V2, others simple casings, provided that casing M attaches to a die for taking out the dry rubber.

Figure 2:
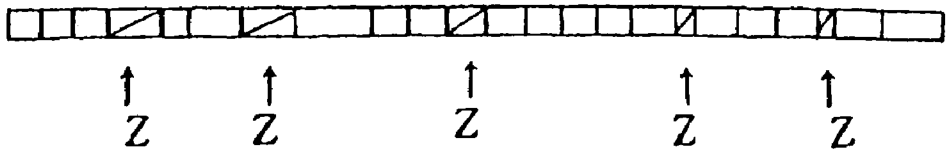
FIG. 2 is a view for a combination of screws showing the positions of backward screws Z.

As shown in FIGS. 3 and 4, the screws are twin screws rotating in the same direction and of a self cleaning type to scrape each other, and they are of a divided type in the same manner as the casings A to M. Further, as shown in FIG. 2, backward screws Z are combined.

The carboxyl group-containing rubber latex and the coagulating solution injected by pumps 2 and 4 are mixed and coagulated in the casing A and transported in a forward direction. A coagulated product containing water and the residual coagulating salt, is retained in a very short time in the slit casings B and D by backward screws Z and dewatered. Further, by warm water flowing from injection holes P and Q, the residual coagulating salt will be flown out of the extruder system from the slit casings B and D to wash the coagulated product. At casings I to M, the water content of the coagulated product can be reduced by setting the temperatures of the casings at high levels and by reducing the pressure from the vent holes V1 and V2, whereby a copolymer will be obtained from the forward end of the casing M. The solid content of the carboxyl group-containing rubber latex is not particularly limited, but is preferably from 20 to 50 mass %. If it is less than 20 mass %, the productivity tends to be poor, and if it exceeds 50 mass %, coagulation tends to be inadequate.

The quantities of flow of the carboxyl group-containing rubber latex, the coagulating solution and the warm water for washing are such that when the quantity of flow of the acryl rubber latex is taken as 10 (by volume), the quantity of flow of the coagulating solution is preferably from 2 to 10, more preferably from 3 to 6. If the quantity of flow is less than 2, the coagulation tends to be inadequate, and if it exceeds 10, the amount of the residual coagulating salt tends to be large. The quantity of flow of the warm water for washing is preferably from 5 to 50, more preferably from 5 to 20, as the total amount from the injection holes P and Q. If the quantity of flow exceeds 50, a loss of the rubber from the slit casings, tends to be large. The temperatures of the casings A to M and the reduced pressures of vents are adjusted depending upon the desired water content of the copolymer. However, if the temperature of the casings exceeds 250° C., deterioration of the copolymer itself will progress, such being undesirable.

When the carboxyl group-containing rubber composition of the present invention is to be practically used, a filler, a plasticizer, a stabilizer, a lubricant, a reinforcing agent, etc. may be added depending upon the particular purpose, followed by molding and vulcanization.

The carboxyl group-containing rubber of the present invention is used upon vulcanizing it by means of a vulcanization system which is commonly used for a carboxyl group-containing rubber. As a vulcanization system to be applied, an aliphatic or aromatic primary amine is suitable, and a vulcanization system having a guanidine type compound added thereto, may preferably be employed.

The aliphatic primary amine may, for example, be hexamethylenediamine, hexamethylenediamine carbamate or tetramethylenepentamine, and the aromatic primary amine may, for example, be 4,4'-methylenedianiline, 4,4'-oxyphenyldiphenylamine, 4,4'-methylenebis(o-chloroaniline), 4,4'-diaminobenzanilide or 3,3'-dimethyl-4,4'-diaminodiphenylmethane.

The guanidine compound may, for example, be guanidine, tetramethylguanidine, dibutylguanidine, diphenylguanidine or di-o-tolylguanidine.

The amount of the amine to be added, is preferably from 0.2 to 5.0 parts by mass, more preferably from 0.5 to 3.0 parts by mass, per 100 parts by mass of the carboxyl group-containing rubber. If it is less than 0.2 part by mass, the vulcanization reaction cannot adequately be carried out, and if it exceeds 5.0 parts by mass, the vulcanization tends to be excessive.

Fillers and reinforcing agents, such as carbon black, silicic anhydride and surface treated calcium carbonate, may be used in combination as a mixture of two or more of them, depending upon the required physical properties of the rubber. The total of their amounts is preferably from 30 to 100 parts by mass per 100 parts by mass of the carboxyl group-containing rubber.

Further, as the machine for kneading, molding and vulcanizing the carboxyl group-containing rubber of the present invention, the carboxyl group-containing rubber composition and its vulcanizate, one which is commonly used in the rubber industry, can be used.

The carboxyl group-containing rubber of the present invention, the carboxyl group-containing rubber composition and its vulcanizate may suitably be used for rubber hoses or sealing components such as gaskets or packings. Further, the rubber hoses may be used specifically as hoses to be used for various pipings, etc. of automobiles, construction machines and hydraulic machines.

The rubber hoses obtainable from the carboxyl group-containing rubber of the present invention, the carboxyl group-containing rubber composition and its vulcanizate, are suitable for use as rubber hoses for automobiles, of which the environment for use has become especially severe recently, since they are excellent not only in the mechanical properties but also in the cold resistance, oil resistance and heat resistance.

Now, the present invention will be described in further detail with reference to Examples, but the present invention is by no means restricted by these Examples.

The apparatus described in detail in the foregoing, was used as the apparatus in the Examples. FIG. 1 is a view illustrating the entire apparatus, FIG. 2 is a view for the combination of screws showing the positions of backward screws Z, FIG. 3 is a view showing the relation between the casing and the screws for the dewatering/drying apparatus, and FIG. 4 is a schematic view illustrating engagement of scraping type (self cleaning type) screws.

In FIG. 1, reference numeral 1 indicates a storage tank for the carboxyl group-containing rubber latex, 3 a storage tank for the coagulating solution, 2 and 4 pumps, and 5 a dewatering/drying apparatus of a screw extruder type with two screws rotating in the same direction and with divided casings A to M connected one another. A indicates a casing for supplying the raw material, B, D and H slit casings, F an injection casing having an injection hole P, J and L vent casings having vent holes V1 and V2, and others simple casings, provided that the casing M attaches to a die for taking out the dry rubber.

As shown in FIGS. 3 and 4, the screws are twin screws rotating in the same direction and of a self cleaning type to scrape each other, and they are of a divided type in the same manner as the casings A to M.

EXAMPLE 1

Into a pressure resistant reactor having an internal capacity of 40 l, 7.8 kg of ethyl acrylate, 3.4 kg of n-butyl acrylate, 0.6 kg of monobutyl maleate, 17 kg of an aqueous solution containing 4 mass % of partially saponified polyvinyl alcohol and 22 g of sodium acetate were charged and preliminarily thoroughly mixed by a stirrer to obtain a uniform suspension. The air at an upper portion of the reactor was displaced by nitrogen. Then, ethylene was injected to the upper portion of the reactor, and the pressure was adjusted to 20 kg/cm$^2$. Stirring was continued, and the interior of the reactor was maintained at 55° C. Then, from a separate injection inlet, an aqueous solution of t-butyl hydroperoxide was injected to initiate the polymerization. While maintaining the internal temperature of the reactor at 55° C., the reaction was completed in 6 hours. The formed polymerization solution was adjusted to a solid content of 35 mass %, to obtain a raw material rubber latex.

Using the apparatus shown in FIG. 1 for precipitation/drying, the raw material rubber latex was supplied at a rate of 60 l/hr, and the aqueous solution containing 5 mass % of ammonium borate was supplied from a storage tank 3 at a rate of 30 l/hr, from pumps 2 and 4, respectively.

Upon initiation of the supply, the rotational speed of screws of the dewatering/drying apparatus 5 was gradually increased to 150 rpm, and the vacuum pumps directly connected to the vent holes V1 and V2 of the vent casings J and L, were operated, so that the pressure was adjusted to 300 Torr. Upon expiration of 10 minutes from the initiation, a stabilized condition was obtained, and from the forward end of the casing M, a crude rubber of a colorless copolymer having a water content of 0.4 mass %, was obtained. Further, the temperatures of the casings were set as follows, and warm water having a temperature of 80° C. was supplied from the injection hole P of the casing F and from the injection hole Q of the casing C at 100 l/hr and 50 l/hr, respectively.

| Symbols of casings | Temperatures |
|---|---|
| I | 140° C. |
| J | 150° C. |
| K | 160° C. |
| L | 170° C. |
| M | 180° C. |

EXAMPLES 2 and 3

Using the same raw material rubber latex as in Example 1, a crude rubber of a copolymer was obtained by changing the flow rate of the coagulating solution as shown in Table 1.

EXAMPLES 4 to 6

Using the same raw material rubber latex as in Examples 1 to 3, a crude rubber of a copolymer was obtained by changing the coagulating solution to a mixed aqueous solution comprising 2 mass % of ammonium borate and 2 mass % of ammonium sulfate.

COMPARATIVE EXAMPLES 1 to 3

Using the same raw material rubber latex as in Examples 1 to 3, a crude rubber of a copolymer was obtained by changing the coagulating solution to a mixed aqueous solution comprising 2 mass % of borax and 2 mass % of ammonium sulfate.

Measurement of the Polymer Yield (Examples 1 to 6 and Comparative Examples 1 to 3)

The polymer yield (mass %) was obtained by the following formula.

$$\text{Polymer yield}=100\times FP/(FL\times 0.35)$$

where FP is the mass of the crude rubber discharged by a die attached to the casing M, per unit time, and FL is the mass of the raw material rubber latex supplied to the casing A per unit time.

With respect to each Example and Comparative Example, the results of measurement of the polymer yield are shown in Table 1.

Preparation of a Vulcanizate (Examples 1 to 6 and Comparative Examples 1 to 3)

The crude rubber obtained in each of the above Examples and Comparative Examples was formed into a blend composition as identified in Table 1, followed by kneading by a 8 inch open roll and formed into a sheet having a thickness of about 2.4 mm, which was subjected to press vulcanization at 170° C. for 10 minutes in a press vulcanization machine, and the product was subjected to the physical property test as a primary vulcanizate. Further, this vulcanizate was subjected to heat treatment at 170° C. for 4 hours in a gear oven to obtain a secondary vulcanizate, which was subjected to the physical property test.

Physical Property Test Method

Mooney scorching time was measured at t5 at 125° C. in accordance with JIS K6300.

The tensile strength and the elongation were measured in accordance with JIS K6251.

The hardness was measured in accordance with JIS K6253.

ΔTB (difference in tensile strength as between the primary vulcanizate and the secondary vulcanizate) was obtained by the following formula.

$$TB(\%)=100\times(TB2/TB1)-100$$

where TB2 represents the tensile strength of the secondary vulcanizate, and TB1 represents the tensile strength of the primary vulcanizate. With respect to each Example and Comparative Example, the results of the measurement of the physical properties of the vulcanizate are shown in Table 1.

TABLE 1

| | | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|---|
| Latex | Flow rate of raw material rubber latex l/hr | | 60 | 60 | 60 | 60 | 60 | 60 | 60 | 60 | 60 |
| Flow rate of the coagulating solution | Composition | Aqueous solution containing 5 wt % of ammonium borate l/hr | 30 | 45 | 60 | | | | | | |
| | | Mixed aqueous solution comprising 2 wt % of ammonium borate and 2 wt % of ammonium sulfate l/hr | | | | 30 | 45 | 60 | | | |
| | | Mixed aqueous solution comprising 2 wt % of borax and 2 wt % of ammonium sulfate l/hr | | | | | | | 30 | 45 | 60 |
| | Polymer yield mass % | | 95 | 95 | 96 | 95 | 95 | 95 | 70 | 80 | 85 |
| Blend | Crude rubber | | 100 | 100 | 100 | 100 | 100 | 100 | 100 | 100 | 100 |
| | Stearic acid | | 1 | 1 | 1 | 1 | 1 | 1 | 1 | 1 | 1 |
| | Anti-aging agent 1) | | 1 | 1 | 1 | 1 | 1 | 1 | 1 | 1 | 1 |
| | MAF carbon black | | 50 | 50 | 50 | 50 | 50 | 50 | 50 | 50 | 50 |
| | Liquid paraffin | | 1 | 1 | 1 | 1 | 1 | 1 | 1 | 1 | 1 |
| | Stearyl amine | | 0.3 | 0.3 | 0.3 | 0.3 | 0.3 | 0.3 | 0.3 | 0.3 | 0.3 |
| | 4,4'-methylenedianiline | | 0.7 | 0.7 | 0.7 | 0.7 | 0.7 | 0.7 | 0.7 | 0.7 | 0.7 |
| | di-o-tolylguanidine | | 2 | 2 | 2 | 2 | 2 | 2 | 2 | 2 | 2 |
| Physical properties | | Mooney scorching time t5 min | 13.0 | 12.2 | 11.4 | 13.0 | 12.5 | 11.2 | 2.2 | 1.5 | 1.1 |
| | Primary vulcanizate | Tensile strength MPa | 12.3 | 12.3 | 12.2 | 12.1 | 12.3 | 12.5 | 12.4 | 12.5 | 12.6 |
| | | Elongation % | 300 | 290 | 310 | 300 | 290 | 290 | 260 | 260 | 240 |
| | | Hardness | 63 | 64 | 63 | 63 | 63 | 63 | 61 | 60 | 59 |
| | Secondary vulcanizate | Tensile strength MPa | 13.3 | 13.3 | 13.2 | 13.1 | 13.3 | 13.5 | 13.5 | 13.5 | 13.6 |
| | | Elongation % | 230 | 220 | 230 | 230 | 220 | 220 | 230 | 230 | 210 |
| | | Hardness | 68 | 70 | 69 | 69 | 70 | 70 | 65 | 63 | 62 |
| | | ΔTB % | +8 | +8 | +8 | +8 | +8 | +8 | +9 | +8 | +8 |

1) No Guard #445, manufactured by Uniroyal Company

From the comparison of Example 1 and Comparative Example 1, it is evident that in Example 1 of the present invention, the Mooney scorching time is long, thus, the resistance to scorching is excellent, and the polymer yield is remarkably improved. The same results are observed from the comparison of Example 4 and Comparative Example 1, from the comparison of Example 2, Example 5 and Comparative Example 2, and from the comparison of Example 3, Example 6 and Comparative Example 3.

Further, in Example 1, ΔTB is small, thus showing a good vulcanization speed.

INDUSTRIAL APPLICABILITY

As shown by comparison between Examples and Comparative Examples, the method of the present invention for producing a dry rubber from a latex of the carboxyl group-containing rubber containing a polyvinyl alcohol as an emulsifier or dispersant by continuously carrying out coagulation, dewatering, washing and drying in a dewatering/drying apparatus of a screw extruder type by means of a coagulating agent containing ammonium borate, and a coagulating agent containing both ammonium borate and ammonium sulfate, presents an excellent polymer yield, and the composition using the obtained carboxyl group-containing rubber as the raw material, has a good vulcanization speed and resistance to scorching.

What is claimed is:

1. A method for producing a carboxyl group-containing rubber wherein a dry rubber is produced from a polyvinyl alcohol-containing latex of a carboxyl group-containing rubber by continuously carrying out coagulation, dewatering, washing and drying in a dewatering/drying apparatus of a screw extruder type, characterized in that a coagulating agent containing ammonium borate is used.

2. The method for producing a carboxyl group-containing rubber according to claim 1, wherein the carboxyl group-containing rubber comprises (A) from 0 to 5 mass % of an ethylene monomer unit, (B) from 0 to 50 mass % of a vinyl acetate monomer unit, (C) from 1 to 12 mass % of a monoalkyl maleate unit of the following formula (1) and/or a monoalkoxyalkyl maleate unit of the formula (2), and (D) from 99 to 33 mass % of an alkyl acrylate unit and/or an alkoxyalkyl acrylate unit:

Formula (1)

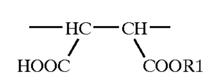

wherein R1 is a $C_{1-4}$ alkyl group,

Formula (2)

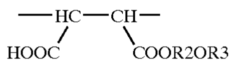

wherein R2 is a $C_{1-4}$ alkylene group, and R3 is a $C_{1-4}$ alkyl group.

3. The method for producing a carboxyl group-containing rubber according to claim 1, wherein the amount of the polyvinyl alcohol is from 2 to 7 parts by mass per 100 parts by mass of the polymer constituting the rubber.

4. The method for producing a carboxyl group-containing rubber according to claim 1, wherein the coagulating agent is a coagulating agent containing ammonium borate and ammonium sulfate together.

5. The method for producing a carboxyl group-containing rubber according to claim 1, wherein a gelling agent for the polyvinyl alcohol is mixed to the coagulating agent.

6. The method for producing a carboxyl group-containing rubber according to claim 1, wherein the amount of the coagulating agent is from 0.2 to 15 parts by mass per 100 parts by mass of the polymer constituting the rubber.

7. The method for producing a carboxyl group-containing rubber according to claim 1, wherein a dewatering/drying apparatus of a screw extruder type having a squeezing mechanism having a forward screw and a backward screw combined in series, is used.

8. A carboxyl group-containing rubber produced by the method as claimed in claim 1.

9. A hose made from the carboxyl group-containing rubber according to claim 1.

10. A sealing component made from the carboxyl group-containing rubber according to claim 1.

11. The sealing component according to claim 10, which is a gasket or a packing.

* * * * *